US006657732B2

United States Patent
Pepper et al.

(10) Patent No.: US 6,657,732 B2
(45) Date of Patent: Dec. 2, 2003

(54) VIBROMETER SYSTEM USING A TWO INPUT BEAM PHASE CONJUGATE MIRROR

(75) Inventors: David M. Pepper, Malibu, CA (US); Gilmore J. Dunning, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 260 days.

(21) Appl. No.: 09/849,641

(22) Filed: May 4, 2001

(65) Prior Publication Data

US 2003/0189712 A1 Oct. 9, 2003

(51) Int. Cl.[7] ................................. G01B 9/02
(52) U.S. Cl. ....................................... 356/502
(58) Field of Search ................. 356/486, 487, 356/493, 502, 28.5, 432; 73/655, 657

(56) References Cited

U.S. PATENT DOCUMENTS 5,229,832 A * 7/1993 Gaynor ........................ 356/502

OTHER PUBLICATIONS

Feinberg, J., "Continuous-wave self-pumped phase conjugator with wide field of view," *Optics Letters,* vol. 8, No. 9, pp. 408–482 (1983).

Feinberg, J., "Self-pumped, continuous-wave phase conjugator using internal reflection," *Optics Letters,* vol. 7, No. 10, p. 486–488 (1982).

Feinberg, J., et al., "Phase-conjugating mirror with continuous-wave gain," *Optics Letters,* vol. 5, No. 12, pp. 519–521 (1980); *ibid,* (Errata), vol. 6, Issue 5, p. 257 (1981).

Matsuda, Y., et al, "Optical Detection of Transient Lamb Waves on Rough Surfaces by a Phase–Conjugate Method," *Jpn. J. Appl. Phys.,* vol. 31, pp. L 987–L 989 (1992).

Paul, M., et al., "Interferometric detection of ultrasound at rough surface using optical phase conjugation," *Appl. Phys. Lett.,* vol. 50, No 22, pp. 1569–1571 (1987).

* cited by examiner

*Primary Examiner*—Samuel A. Turner
(74) *Attorney, Agent, or Firm*—Ladas & Parry

(57) ABSTRACT

A vibrometer for probing an object to determine its vibratory signature and a method of probing same. The vibrometer includes a laser for generating a laser beam for probing the object; a detector for detecting reflections from the object; and a two beam input phase-conjugate mirror located so as to receive a portion of the laser beam produced by the laser and a portion of the laser beam reflected from the object, the two input beam phase-conjugate mirror reflecting received diffuse signals from the object back towards the object.

54 Claims, 7 Drawing Sheets

VIBROMETER SYSTEM USING A TWO INPUT BEAM PHASE CONJUGATE MIRROR

TECHNICAL FIELD

The present invention relates to vibrometry and vibrometers. Vibrometers measure the vibrations of an object in response an impinging beam (usually a laser beam) for the purpose of measuring the vibrations which result therefrom. Vibrometry and vibrometers can be used for non-destructive testing of products and can also be used in the military field for landmine detection, target identification, lethality assessment, etc.

BACKGROUND OF THE INVENTION

In the field of vibrometry, the prior art includes Fabry Perot inferometers which suffer from being bulky, expensive, and offer poor resolution at low frequencies for a reasonable length device. The prior art also includes Phase Conjugate Mirrors (PCMs), which tend to be difficult to align because they tend to require diffraction-limited plane waves with precision alignment. Thus, typical PCMs, besides being difficult in terms of alignment, would not be expected to stand up well in the field where the military might be using the device. The prior art also includes self-pumped PCMs (SP-PCMs), which only use a single beam to function, the beam being the same beam whose wavefront-reversed replica is sought. This type of SP-PCM is sometimes referred to as a "cat conjugator." Such SP-PCMs function over a limited Field Of View (FOV), are typically slow to respond (since the incident, scattered beam may be very low in power at the device), and, moreover, typically possess phase-conjugate reflectivities less than unity (typically, in the 25% to 35% range). As such, the prior art SP-PCMs have a number of disadvantages which become particularity evident when the object being tested has a low reflectivity to light.

The prior art also includes double-pumped PCMs (DP-PCMs), but these devices have a problem of having to match the intensity of both beams impinging the DP-PCM. The prior art also includes two-wave mixers, but these devices tend to be FOV limited. The prior art also includes single-pixel interferometers, but these devices suffer from poor light gathering efficiency, a limited FOV, dropouts and moreover rely on fortuitous speckle, which implies a long dwell time in order for the device to function. The prior art also includes photo-emf devices, but such devices are not shot-noise limited, have a limited FOV and also have a limited bandwidth. The prior art further includes adaptive optical mirrors, but such devices tend to have a limited number of pixels, are complex and have bulky electronics associated therewith.

Many objects whose vibratory signature is sought have rough surfaces and thus tend to scatter the incident probe beam into many speckles. The scatter light speckles can find their way back into prior art vibrometers which will tend to degrade the performance of those vibrometers. In order to avoid this sort of degradation, prior art vibrometers employ focusing optics to limit the returned light to a single speckle.

The present invention addresses many of the problems associated with prior art vibrometers. The present invention uses a self-pumped "kitty" Phase Conjugate Mirror (PCM) with gain. "Kitty" PCMs are described by J. Feinberg in Opt. Lett. 8, 480 (1983) and also discussed below. This device tends to have a wide FOV (the FOV may well fall in the range of 45° to 90° or even greater), can generate a phase-conjugate wave with greater power than the incident beam (e.g. gains in the range of 10 to 10,000) and enables the vibrometer with such a device to function even if the surfaces being sampled are not specular or polished, but rather are lossy (i.e. the surfaces being sampled exhibit low reflectivities and the reflected light can include thousands to millions of speckles). Indeed, in the disclosed embodiments, the detector associated with the vibrometer is allowed to "read" many or most of those speckles (the more speckles which are detected the better, but at least some speckles are likely lost). Thus, the device can be used to measure vibrations in the earth, composite structures, unpolished metallic or ceramic surfaces, or other highly scattering surfaces. Of course, the device can also be used to measure the vibrations of polished surfaces, but the surfaces whose vibrations are to be measured, need not be polished.

BRIEF DESCRIPTION OF THE INVENTION

In one aspect, the present invention provides a vibrometer for probing an object at a distance to determine its vibratory signature, the vibrometer comprising: a laser for generating a laser beam for probing the object; a detector for detecting reflections from the object; and a two beam input phase-conjugate mirror located so as to receive a portion of the laser beam produced by the laser and a portion of the laser beam reflected from the object, the two input beam phase-conjugate mirror reflecting received diffuse (multi-speckled) signals from the object back towards the object in a wavefront reversed manner, thereby compensating for wavefront distortions.

In another aspect, the present invention provides an apparatus for improving a lasing vibrometer, the apparatus comprising a two beam input phase-conjugate mirror located so as to receive a portion of a laser beam produced by the vibrometer and a portion of a laser beam reflected from an object whose vibratory signature is sought, the two input beam phase-conjugate mirror reflecting received laser light reflected by the object back towards the object as a wavefront-reversed replica of the received laser light.

In still yet another aspect, the present invention provides a method of obtaining a vibratory signature of an object, the method comprising the steps of impinging the object with a probing laser beam; directing light scattered by the object to a two beam input phase-conjugate mirror; pumping the two beam input phase-conjugate mirror; directing light reflected by a two beam input phase-conjugate mirror back to the object; and directing light from two beam input phase-conjugate mirror which is reflected by the object towards the probing laser beam towards a detector apparatus, with diffraction-limited beam quality and with an optical power level that can exceed that of the incident probe beam that illuminated the object initially.

BRIEF DESCRIPTION OF THE DRAWINGS

The invention can be better visualized by reference to the following drawings wherein.

DETAILED DESCRIPTION OF THE PREFERRED EMBODIMENTS

Figure 1A:
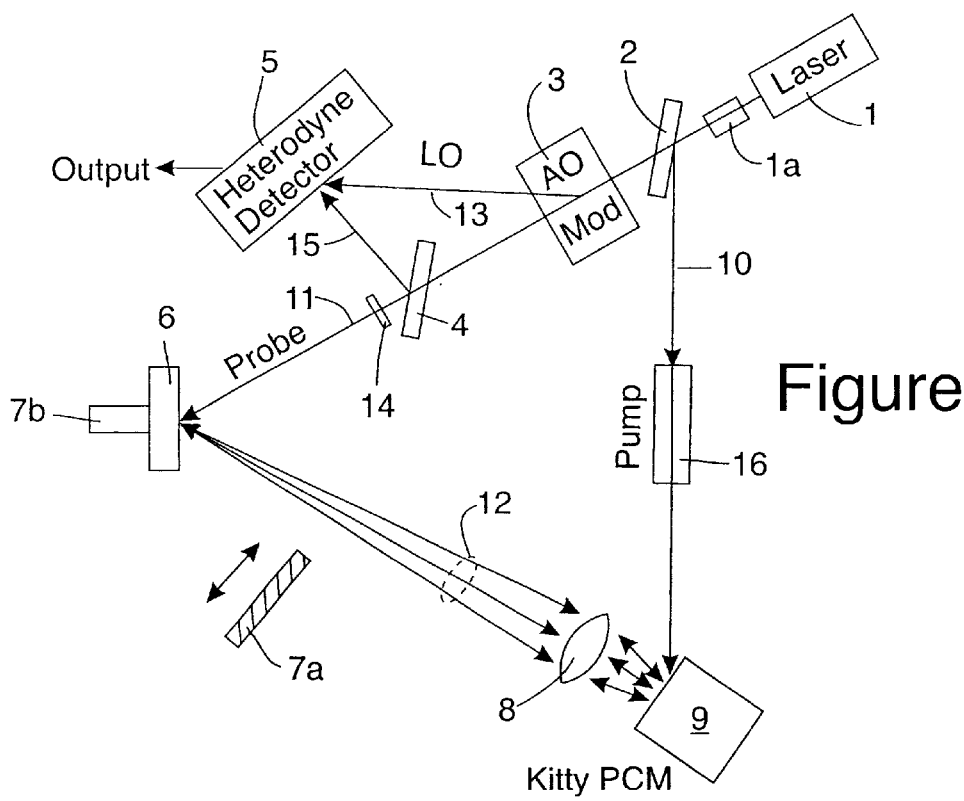
FIG. 1a is a schematic drawing of the basic system architecture in accordance with the present invention for a heterodyne detection system.

FIG. 1a is a schematic diagram of the basic system architecture of one embodiment of the present invention utilizing a laser and a heterodyne detector. An embodiment of the invention utilizing a laser and a homodyne detector is described with reference to FIG. 1b. Turning first to FIG. 1a, a laser 1 is provided which may be provided by a diode-pump solid state laser, an argon ion laser, a laser diode or other lasing device. Its output is preferably applied to an optical isolator 1a which prevents reflected beams from re-entering the laser 1 which could otherwise cause instability in the laser 1. The laser's output is applied to a beam splitter 2 which directs a portion 10 of the laser beam to the kitty PCM 9 and another portion 11 of the outputted beam to an object 6 whose vibratory signature is of interest. The object 6 may be a relatively small industrial sample or a relatively large military object or anything else which can exhibit a vibratory signature. The object 6 is caused to vibrate either actively or passively. In the former case, a transducer can be attached to the object 6 (see element 7b in FIG. 1a) to cause it to vibrate. Other active means for imparting vibrations into the object 6 include a pulsed or otherwise modulated laser that strikes the object 6 (on any of its surfaces), an air-coupled transducer, an eddy current transducer, or a water jet with a modulated stream that strikes the object. Examples of passive (internally generated) excitations include seismic disturbances in the ground, surfaces vibrations in vehicles (for example) imparted by engines and/or other internal moving components and bearings, or, in the case of lethality assessment, vibration signatures (and their differences) resulting from the functioning (or malfunctioning) of electro-mechanical or other devices on an object. In all of these cases, the whole-body vibrations or locally excited acoustic modes will result in vibrations on the surface(s) of the object, whose amplitude and frequency is to be sensed by the present invention.

The vibrating object 6 reflects a portion of the laser beam in the direction of a lens 8 (or other light diffractive element). Since, the object 6 may have a rough surface, the reflected beams may be diffused (as represented by the multiple beams 12 reflecting off the surface of object 6. Lens 8 collects some of these diffused reflected beams 12 and directs them to the kitty PCM device 9. The vibrational modes of the sample will be sampled by the disclosed apparatus and method.

The class of PCM used in this embodiment of the invention is the so called "kitty" PCM described by J. Feinberg in Opt. Lett. 8, 480 (1983), the disclosure of which is hereby incorporated by reference. The "kitty" PCM involves a photorefractive crystal with a pair of coherent input beams: a "pump" beam and a "probe" beam. In FIG. 1a, the pump beam is labeled by reference numeral 10 while the probe beam is labeled with reference numeral 11. The probe beam 11 reflects off the surface of the object 6 and thence is labeled as a reflected probe beam 12. In operation the first beam 10 will, by virtue of a variety of mechanisms and architectures (examples include an internal loop, an external loop, etc.), result in a self-pumped PCM device 9. That is, beam 10 will interact with the crystal 9 to form a phase-conjugate replica of itself. A single-input beam class PCM is referred to as a "cat" conjugator. This incident beam, in conjunction with its self-pumped wavefront-reversed replica, acts as an effective conjugate pair of the required pump beams in a four-wave mixing configuration within the same crystal in a single input PCM device. The disclosed apparatus uses a "kitty" conjugator or "kitty" PCM which utilizes a pair of input beams. The first input beam is the previously discussed "pump" beam 10. The second input beam is the reflected probe beam 12. The two input beam device, so-called "kitty" conjugator, reflects a wavefront-reversed replica of the reflected probe 12 beam so that the wavefront-reversed replica of the reflected probe beam 12 will converge on the sample in the same spot drawn where the probe beam 11 impinges same, reflecting along the beam path taken by beam 11 until beam splitter 4 re-directs the wavefront-reversed replica of the reflected beam off surface 6 towards the heterodyne detector 5. The wavefront-reversed replica of the reflected probe beam 12 as it is directed towards object 6 is not given a separate identifying numeral in FIG. 1a, but its presence is signified by the fact that the arrows representing the probe beams 12 are shown as indicating the laser light of those beams is moving in two directions, namely toward lens 8 and than back towards object 6 after having been formed into a wavefront-reversed replica of the reflected probe beams travelling towards lens 8. After the wavefront-reversed replica of the reflected probe beam reflects off object 6 it is directed back towards beam splitter 4 where it is reflected towards heterodyne detector 5 and labeled as beam 15. The beam emitted by laser 1 will desirously comprise a single speckle. After reflecting initially from object 6, the reflected light will be diffuse, that is, it will be made up of many speckles, particularly if the surface of object 6 which is impinged is rough. The beam which returns from the kitty PCM 9 will similarly comprise many speckles, but those speckles will resolve back to essentially a single speckle when reflected off object 6 back towards detector 5. However, since the light which initially reflects from object 6 can be highly speckled, a small amount of that highly speckled light will apt to be reflected back towards detector 5. Additionally, if the optics are not perfect, some speckling of the light is apt to occur for that reason as well. An optical spatial filter 14 can be used to inhibit the speckled light from reaching the detector 5. The spatial filter 14 is designed to pass a single speckle (i.e. single spatial mode) with little or no loss. Since the incident beam 11 is a single speckle, it passes spatial filter 14 with very little or no loss. As a result of the kitty PCM 9, the light backward-headed beam 15 resolves back to a single speckle and therefore it too will pass back through spatial filter 14 with very little or no loss. However, speckled light will be blocked by spatial filter 14 thereby preventing the speckled light from corrupting the detector 5.

As previously mentioned, a portion of the output laser beam is split off to serve as a "pump" beam 10 for the kitty PCM 9. The other portion of the laser beam enters an Acousto Optic (AO) modulator 3 the function of which is to generate a local oscillator reference signal 13 for the heterodyne detection of the vibrometer output by heterodyne detector 5. Those skilled in the art will appreciate that beam 13 and beam 15 would typically enter the heterodyne detector being superimposed upon each other so that they co-propagate and are co-polarized. Thus, additional beam splitters, mirrors and other optical devices would typically be used to attain that end, but since the use of heterodyne detectors 5 in combination with AO modulators 3 is well known in the vibrometry art, the particular techniques to superimpose the two beams 13, 15 need not be discussed here.

The frequency shifted beam 13 (which may be 40 MHz, depending upon the desired vibrometer bandwidth) that defracts from the AO modulator 3 is used as a Local Oscillator (LO) reference beam for the heterodyne detector 5. The undiffracted part, which is in general of greater amplitude, serves as the probe beam 11 that scatters off the surface of object 6 whose vibration signature is sought.

Given the high frequencies of ultrasound to be detected in the vibrating sample, which may be in the MHz range, the kitty PCM 9 allows the useful information to pass (i.e., difract off the real-time gratings into a retro-direction) while compensating for low-frequency spatial and temporal phase noise and wavefront distortions. The kitty PCM 9 has been shown to provide for real-time wavefront compensation over a wide field-of-view, with phase-conjugate gain. Small signal gains, G, in excess of 1000 times have been reported in the prior art by Feinberg. "Small signal" here means that the input phase-conjugate power as well as the output phase-conjugate power are both much less (by at least a factor of G) than the pump power. Here $$G = \frac{\text{Output phase} - \text{conjugate optical power}}{\text{Input probe beam optical power}}.$$

Both attributes, field-of-view and gain, are important given the diffuse scattering nature and low reflectivity of many industrial, biological and military samples. It is also important to note that the self-pumped kitty PCM 9, by virtue of its conjugate pump-beam pair, enables one to realize a faithful conjugator for the probe beam even if the pump beam is not diffraction limited. This property greatly relaxes the typical constraint that prior art four-wave mixers have in the context of requiring perfect counter-propagating and overlapping plane waves for high-fidelity conjugation generation. Thus, a non-diffraction-limited pump beam 10 can be used, greatly simplifying the system architecture, since no spatial filters are needed and also greatly simplifying alignment issues, since there is no particular need to realize perfectly counter-propagation externally supplied beams. The phase-conjugate replica of the pump beam is automatically counter-propagating and overlapping.

If desired, an optical amplifier 16 may be used in this embodiment (or may be similarly used in the other disclosed embodiments), in order to increase the power of the pump beam before it reaches the kitty PCM 9.

Figure 1B:
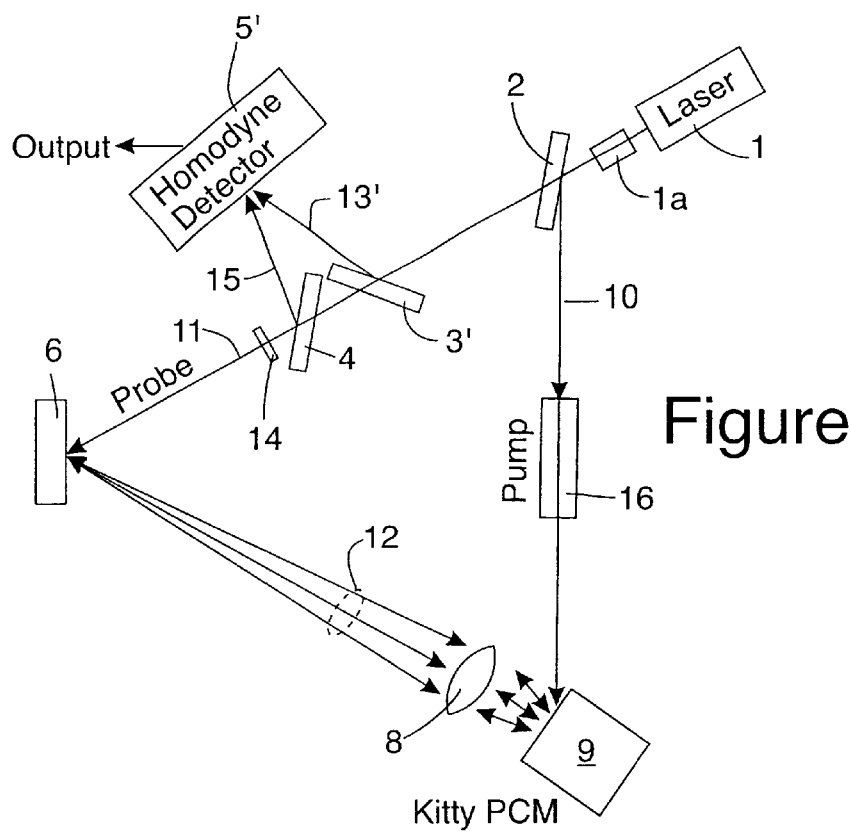
FIG. 1b is a schematic drawing of the basic system architecture in accordance with the present invention for a homodyne detection system.

FIG. 1b shows an embodiment of this invention that employs a homodyne detector 5' instead of a heterodyne detector 5. Most of the elements of this second embodiment are the same as in the first embodiment of FIG. 1a and therefore are not described in further detail here. Rather this description of FIG. 1b will focus on the elements which differ from the embodiment of FIG. 1a.

Detectors 5, 5' are both examples of coherent detectors. The homodyne detector 5' requires two incident beams, as does the heterodyne detector: a signal beam 15 and a local oscillator beam 13'. The difference, however, is that the local oscillator (LO) of the heterodyne detector 5 is offset in frequency relative to the signal beam (in the example set forth in the embodiment of FIG. 1a, the offset is 40 MHz). By contrast, the LO of homodyne detector 5' is not offset in frequency and therefore it possesses the same nominal frequency as does the signal beam. The relative benefits and tradeoffs among these two coherent detector systems are well-known in the art. Simply stated, the homodyne system possess a 3 dB advantage in signal-to-noise relative to the heterodyne system, but, requires a phase-tracking system to maintain quadrature operation (i.e., a 90° phase shift) between the signal and LO, which adds additional complexity to the homodyne detector 5'.

Continuing to refer to FIG. 1b, the LO is derived from a beam splitter 3' that diverts a portion 13' of the laser output beam (without any frequency offset) towards the homodyne detector 5'. The beam splitter 3' effectively replaces the AO modulator 3 of the heterodyne system of FIG. 1a, which diverts and, at the same time, frequency offsets, a portion of the laser beam towards the heterodyne detector 5 of FIG. 1a. The homodyne detector module 5' contains beam splitters, and other optical and photonics elements to properly combine and optically phase shift the two input beams, along with electronic post-processing and tracking networks to provide the desired output, which corresponds to either the surface displacement or the velocity of the object 6.

Figure 2:
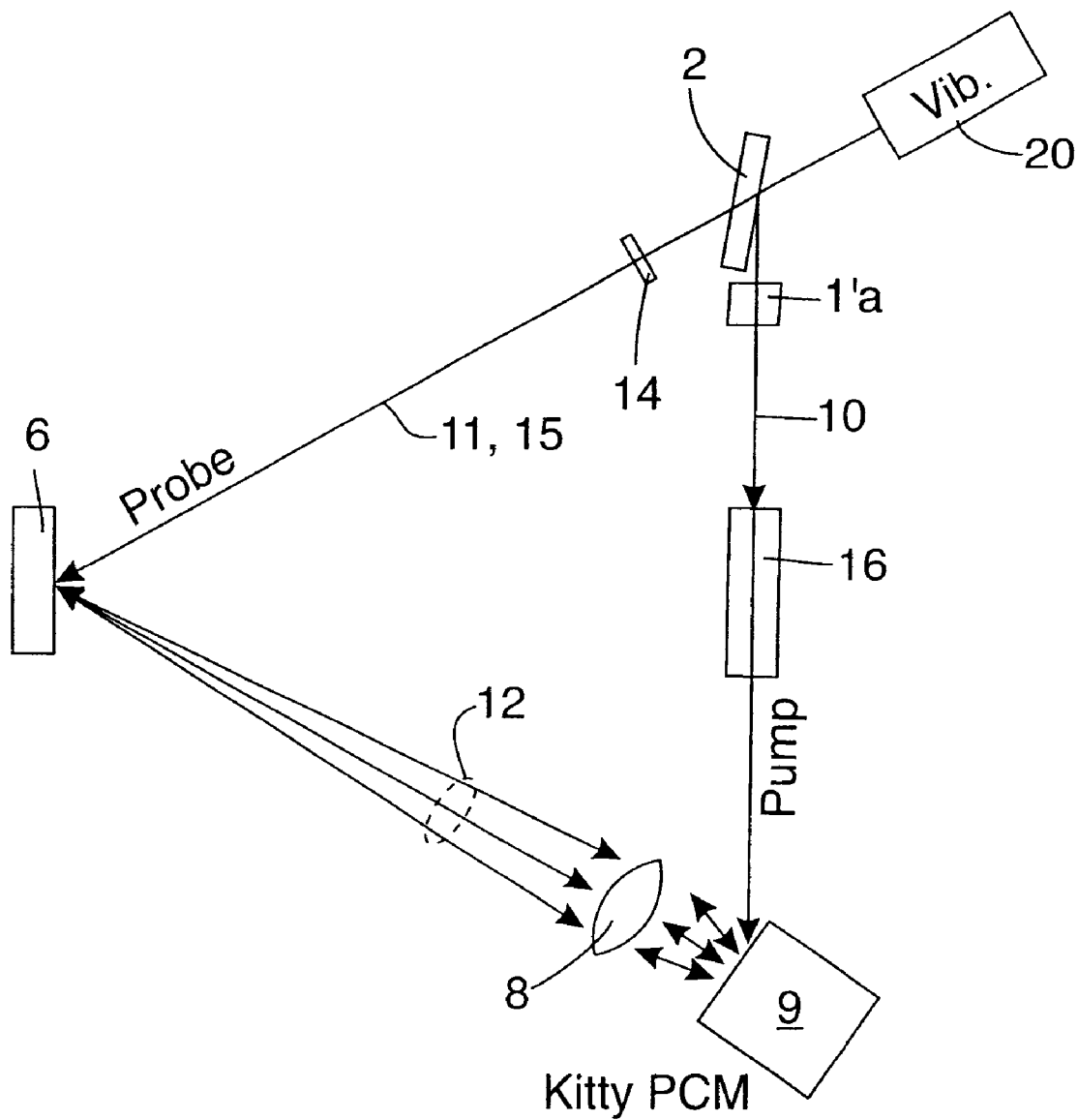
FIG. 2 is a schematic diagram of the invention showing how it might be used to modify a conventional prior art vibrometer.

It is also to be noted that the kitty PCM system discussed above can be used to augment commercial off-the-shelf vibrometers to enhance their performance significantly in terms of dramatically improving the robustness of the vibrometer. This is especially true in terms of lessened alignment requirements, more tolerant placement of the beams relative to the sample under test, and the improved collection of highly scattered and speckled reflective beams from the object 6 to be characterized. FIG. 2 shows a commercial off-the-shelf vibrometer 20 and the aforementioned kitty PCM 9 together with other elements so that a wavefront-reversed replica of the reflected probe beam will reflect off object 6 and be directed back into the vibrometer 20.

Turning now to FIG. 2, a standard off-the-shelf vibrometer 20 is depicted along with other elements discussed above with reference to FIGS. 1a and 1b. This figure shows how certain components can be added to a standard off-the-shelf vibrometer 20 in order to arrive at the present invention. A standard off-the-shelf vibrometer 20 typically includes a laser 1 and acousto-optic modulator 3 and a heterodyne detector 5 (shown in FIG. 1a, for example) together with appropriate mirrors, beam splitters and the like. Such off-the-shelf vibrometers 20 are manufactured by such companies as Polytec, BM Industries, and MetroLaser. Note the placement of beam splitter 2 in this embodiment. Here, the beam splitter 2 is arranged downstream of the AO modulator 3 which is located within the existing vibrometer 20. In this embodiment, the beam splitter 2 splits off beam 10, namely the pump beam, and directs it towards an input of the kitty self pumped PCM device 9. An optical isolator 1'a is preferably disposed in the path 10 to prevent its phase-conjugate replica generated by PCM 9 from re-entering the vibrometer 20 where it might otherwise degrade the performance of the vibrometer 20. If desired, an optical amplifier 16 may be used in this embodiment (or may be similarly used in the other embodiments), in order to increase the power of the pump beam before it reaches the kitty PCM 9. The probe beam 11 is directed to the object 6 being examined, which is shown as having a roughened surface, so that the reflected beam 12 is diffused as it passes through lens 8 and then impinges the kitty PCM 9. As in the first and second embodiments of FIGS. 1a and 1b, the reflected probe beam 12 reflects off the kitty PCM 9 in the form of a phase-conjugate replica of itself which expands towards lens 8, and then converges again on the object 6. At the speed of light and with the distances involved, essentially no movement of the test sample occurs during the short time frame it takes for the light to travel from the surface of the object 6 to the PCM 9 and back. Thus, the phase-conjugate replica beam is reflected by the surface of object 6 as beam 15 colinearly with probe beam 11, but moving in the opposite direction, passing through beam splitter 2 in this embodiment and re-entering the existing prior art vibrometer 20 for the purposes of measurement. Therefore, the phase-conjugate beam that re-enters the vibrometer 20 will possess a wavefront essentially identical to the beam which initially exited the vibrometer 20, but, now with the imposed vibration information (i.e., a Doppler shifted probe-beam signature). In terms of the wavefront of the beam, the return beam that re-enters the vibrometer 20 will appear to the vibrometer 20 as a single spatial mode, or, speckle, even though many speckles (or, spatial modes) were processed by the PCM 9 (by collecting the highly diffuse and scattered light from object 6, and double-passing the sample with the conjugate beam). The result is that the return beam that re-enters the vibrometer 20 is of greater amplitude relative to a conventional vibrometer system. The greater amplitude can improve the performance of contentional vibrometers, especially in the presence of a weak return beam. This invention can enable conventional vibrometers to be used with low reflectivity samples due to the fact that (1) the present invention permits the collection of many speckles or spatial modes (and not just one speckle like the prior art) and (2) the amplifying effect of the kitty PCM 9. Moreover the present embodiment will be far less likely to experience amplitude "drop outs" (by contrast, a single-speckle conventional vibrometer set-up typically encounters many such drop outs due to speckle features missing the aperture of the vibrometer). In addition, the sensitivity of the system will be enhanced since the beam double-passes the sample, so that it is Doppler-shifted twice (once per transit and reflection). Finally, the present embodiment does not require that the vibrometer be critically positioned from the sample at a focal length distance, as is typically the case with standard off-the-shelf vibrometers (the latter follows from the phase-conjugate property of the enhanced system; the return beam will exactly match that of the original exiting beam in the present embodiment). All these features enable the compensated system to be far more robust and adaptive relative to the existing state-of-the-art.

Figure 3B:
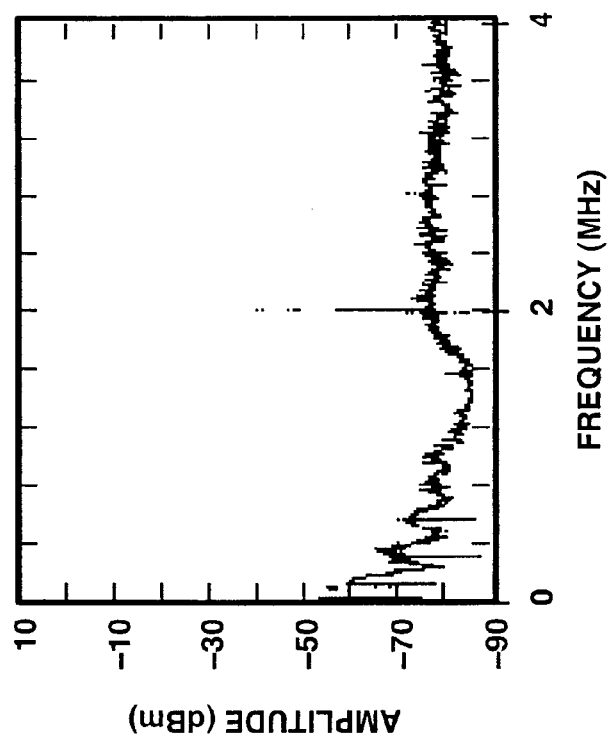
FIG. 3b is a graph of spectrum analyzer output of the heterodyne detector for a 2 MHz excited object with the PCM not being blocked by the aforementioned conventional mirror.
Figure 3A:
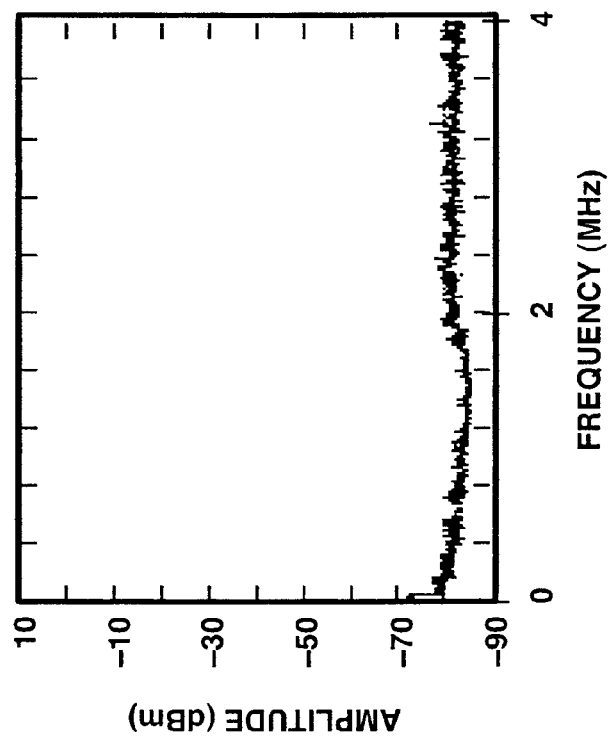
FIG. 3a is a graph of spectrum analyzer output of the heterodyne detector for a 2 MHz excited object, but with a conventional mirror reflecting the light back towards the object in place of the PCM.

Turning again to the embodiment of FIG. 1a, the apparatus shown thereby has been subjected to testing and FIGS. 3a and 3b depict the results of such testing. These figures show a spectrum analyzer output of the heterodyne detector 5 for an object 6 which was excited using a 2 MHz PZT transducer 7b in order to give the object 6 a vibration signature. A mirror 7a was placed so that it could be moved into the path of the diffuse reflected beams 12 for the purposes of reflecting them back towards object 6 without phase-conjugate reflection off the kitty PCM 9. FIG. 3a shows what the vibration signature looked like with the mirror 7a disposed in the path of the diffusely reflected beams 12. FIG. 3b shows the spectrum analyzer output with the mirror 7a moved out of the paths of the reflected beams 12, so that they are phase-conjugate reflected by the kitty PCM 9 back to the object 6. Thus, mirror 7a and PZT crystal 7b form no part of the invention, but rather were merely used to test the effectiveness of the first embodiment of FIG. 1a in finding the vibratory signature of object 6. The PZT crystal 7b was excited at 2 MHz to give the object 6 an arbitrary signature at that frequency. In comparing FIGS. 3a and 3b, note the sharp response in FIG. 3b to the 2 MHz vibration signature depicted by the apparatus of FIG. 1a, whereas when a plane mirror 7a is placed to reflect the diffused beams 12, the 2 MHz signature is buried in the noise floor as can be seen by reference to FIG. 3a.

In the embodiment of FIG. 1a, a heterodyne system architecture is utilized for coherent detection of the remote sensing beam 11. However, as previously indicated, homodyne detection can also be used (see the embodiment of FIG. 1b) in which case the AO modulator 3 is replaced by a conventional beam splitter 3' with a PZT or other optical phase-shifting means and is servo-controlled to maintain quadrature. The use of a heterodyne detector 5 is preferred, since it circumvents the need for quadrature operation, which is required for other classes of homodyne detection systems, such as two-wave mixers. The price one pays is a factor of two less shot-noise limited sensitivity, but in many applications, this is a small price to pay when one considers the fact that the tracking of the slowly varying phase shifts can be processed electronically by a heterodyne detection tracking post-processor, coupled with the 30 dB improvement in system performance. The 30 dB improvement in the system is typical of results obtained when comparing the shot-noise limited sensitivity of interferometers using diffuse surfaces versus single-spatial-mode probe beams, the latter of which is equivalent to collecting many speckles from a diffuse surface and utilizing the present invention.

The present invention provides a number of advantages over the prior art, including one or more of the following:

1. The system is easy to align relative to other conjugators with gain (such as externally pumped four-wave mixers). In this invention, the pumps are auto-aligned and perfectly overlapping (since they are conjugates of each other).

2. Since the pump beams are conjugates of each other, non-diffraction-limited pumps can be used (conventional four-wave mixers typically employ plane waves as the pumps, since it is not practical to employ a second conjugator to derive the counter-propagating pump beam).

3. The system has a wide field-of-view, which is important for probing surfaces with large-angle (diffuse) scattering. This is very important, since conventional vibrometers require a single spatial mode (or, speckle) to function. This system can function in the face of hundreds of thousands of spatial modes (or more), enabling it to sense more of the available light in the scattered probe beam from the surface under inspection.

4. The system can augment existing vibrometers with minimal modification.

5. This class of conjugator (the "kitty" PCM) can possess optical gain, so that the conjugate wave can be amplified.

This is important for interrogating surfaces with loss, such as the ground, low-reflectivity components (unpolished metals, composites, ceramics, etc.), typical of real-world scenarios in the field or in the factory.

6. The response time of this PCM can be faster than a self-pumped device (with a low-power probe). It is also faster responding than a double-pumped conjugator (DP-PCM) under the same conditions.

7. The phase-conjugate nature of the return beam provides for automatic tilt-error correction, beam wander compensation (e.g., wobbling, relative platform motion), and compensation for static and dynamic phase distortions (imperfect optics, time-varying atmospheric distortions, fiber flexing), subject to the response time of the PCM relative to the time scale of the distortions.

8. The system can be configured to correct for depolarized beams (see FIGS. 4a, 4b and 5 and the related description).

9. The system can be configured so that multi-mode optical fibers can be used for beam delivery and collection, resulting in a compact sensor head with a wide FOV, and, further, the sensitive optical elements can be packaged remotely for safety and environmental immunity. The conjugate nature of the system allows for this, in spite of the fact that the system is basically a shot-noise limited interferometer/velocimeter 10. These PCMs can enable shot-noise-limited detection of surface displacements, over large bandwidths, limited by the coherent detector and not by the compensation element (photo-emf sensors, on the other hand, are not shot-noise limited, and moreover, have a finite detection bandwidth).

11. The use of a heterodyne detection system simplifies the need for quadrature control of the local oscillator and signal (required for homodyne detection). A factor of 2 penalty in shot-noise limited performance is a small price to pay for this convenience, and thus heterodyne detection is presently preferred. However, others practicing this invention may come to a different conclusion and therefor opt for homodyne detection. Conventional post-processing and tracking allows for measuring time-dependent displacements in excess of one wave and can have dynamic ranges covering many waves, say, to 10,000 waves.

12. The kitty PCM allows for non-planar pump waves to be employed and is also auto-aligning for the single pump wave that is supplied, greatly simplifying both system architecture and alignment requirements. Moreover, it greatly relaxes the spatial mode requirements of the pump beam relative to other classes of PCMs (for example, a non-planar pump can be used). For example, a spatially distorted pump beam can be used, with good system performance, since these distortions are not transferred to the probe beam.

The vibrometer disclosed herein has a "compensation bandwidth" and a "detection bandwidth" which are related to different time scales. One of the time scale relates to the speed at which the PCM 9 can compensate for undesirable optical distortions (or dynamic wavefront distortions), which is referred to as "compensation" bandwidth. The second time scale relates to the speed at which the system can detect the ultrasonic vibrations of object 6 (i.e. the vibratory signature to be detected) and is known as "detection" bandwidth. The undesirable optical distortions have time scales in the few Hz to 10 kHz range. The object 6 under test when excited by a pulsed (10 nsec.) laser, for example, vibrates ultrasonically and typically in the 100 kHz to 1 GHz range. In the embodiment disclosed with reference to FIG. 1a, the AO modulator 3 produces a 40 MHz LO reference signal to detect signatures up to 40 MHz. The disclosed system is certainly not limited to a 40 MHz detection bandwidth. Higher frequency LOs can be obtained using appropriate AO modulators or by the use of standard frequency-offset laser techniques well known in the art or by electro-optic travelling-wave modulators or other photonic devices known in the art.

The kitty PCM device 9 basically acts as a high-pass filter which passes the desired high frequency ultrasound signals resulting from the vibrating object 6 while compensating for lower frequency distortions which are basically filtered out by the real-time holographic processes that underline the basic functioning of the kitty PCM 9.

The kitty PCM 9 utilizes a crystal that can take a number of forms. The form which was used in the test referred to above was a poled barium titanate crystal. However, other crystals can be used for kitty PCMs, including other photorefractive crystals, semiconductors and certain polymers, as is well known in the art. Still other crystals and non-linear optical materials, including photorefractive polymers, multiple quantum wells or general real-time holographic media may be used for kitty PCMs. Depending upon the specific dopant used or the specific semiconductor compound or structure used, the wavelength of operation of the kitty PCM can be engineered to go further into the infrared, such as, for example, 500 or 800 nm to greater than 1060 nm in barium titanate. Other dopants can be used to increase the speed of response to the crystal. In general, the speed of response of the crystal can be increased, leading to higher compensation bandwidths, by increasing the incident optical intensity or by using crystals with very high carrier mobilities, such as GaAs, Fe:InP, or V:CdTe, each of which may require a different wavelength laser in order to function properly.

In general, the energy in beam 10 pumping the kitty PCM crystal 9 will be 500, or even 1000 times greater than the amount of energy in the diffused reflective beams 12. Of course, if need be, an optical amplifier 16 can be used to increase the power of the pump thereby increasing the speed of response of the crystal comprising the kitty PCM 9 as well as enabling greater phase conjugate gains to be realized.

Figure 4A:
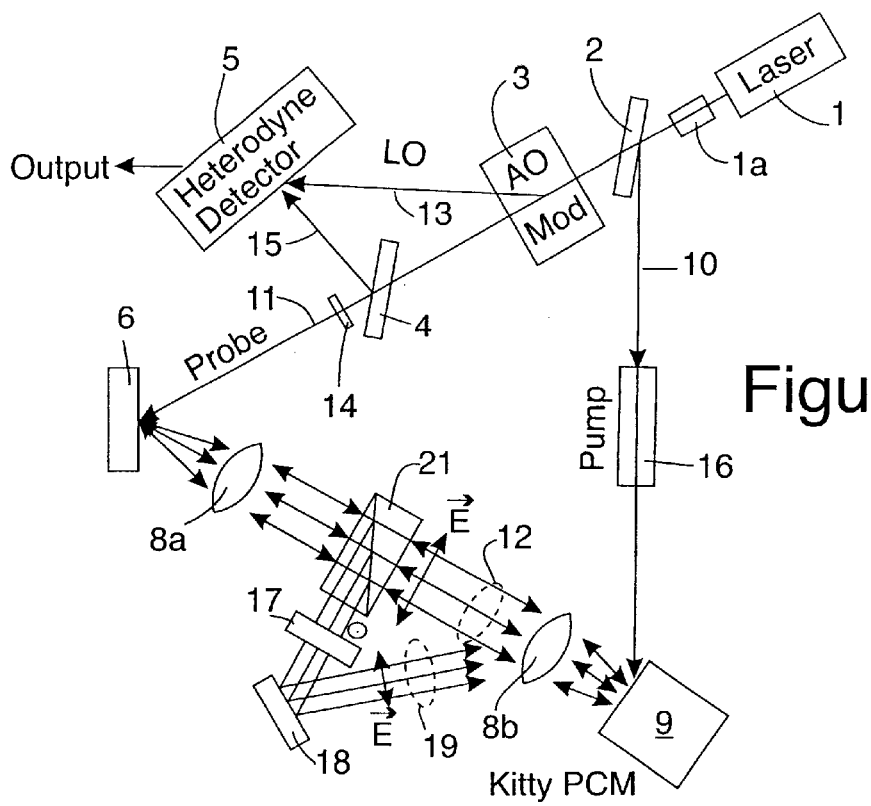
FIG. 4a is a modified version of the embodiment of FIG. 1a which includes additional elements to help correct for depolarized reflections from the object being examined.
Figure 4B:
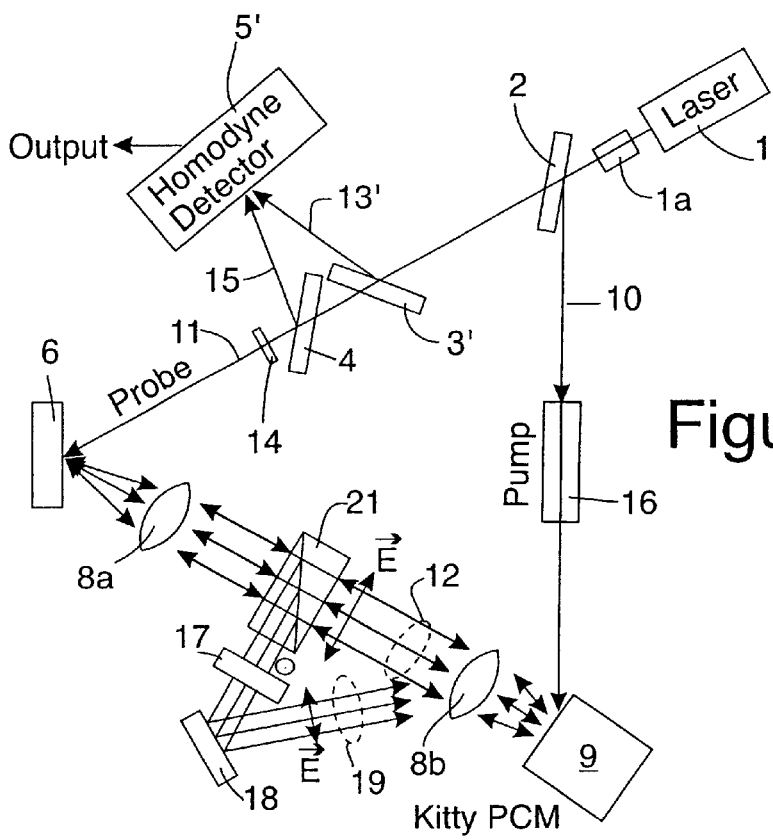
FIG. 4b is a modified version of the embodiment of FIG. 1b which includes additional elements to help correct for depolarized reflections from the object being examined.
Figure 5:
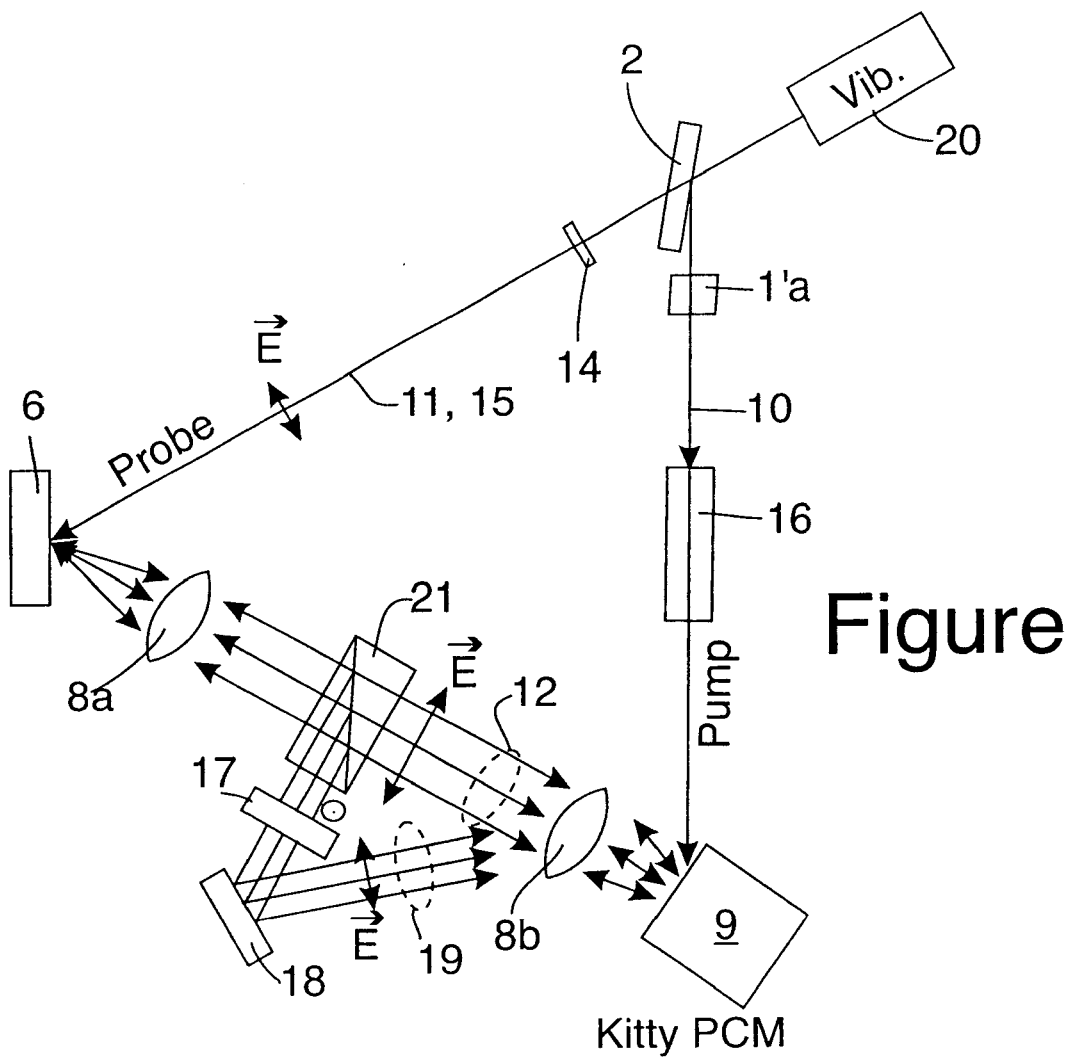
FIG. 5 is a modified version of the embodiment of FIG. 2 which includes additional elements to help correct for depolarized reflections from the object being examined.

As indicated above, the disclosed system can be configured to correct for depolarized beams and a modification of the systems shown in FIGS. 1a, 1b and 2 is depicted by FIGS. 4a, 4b and 5, respectively. The function of lens 8 of FIGS. 1a, 1b and 2 is now performed by two lenses 8a and 8b (or other light diffractive elements) in FIGS. 4a, 4b and 5. Assuming that the probe beam 11 is linearly polarized in the plane of the figures (i.e. P-polarized—that is the probe beam 11 possess an electric field which is aligned to be in the plane of that figures as indicated by the double headed arrow which crosses beam 11 in FIGS. 4a, 4b and 5), the beam which is scattered by the object 6 can, in general, emerge as a depolarized optical beam. For example, the incident probe beam may be P-polarized when first striking the object 6, may be reflected as a highly scattered, elliptically polarized beam. By definition, an elliptically polarized beam consists of both orthogonal linear polarization states, namely, a P-polarized component and a S-polarized component (where S-polarization refers to a beam having an electric field which is perpendicular to the plane of the figures), with an arbitrary phase shift between these two orthogonal linearly polarized components. After reflecting from the object 6, the scattered beam is collected by lens 8a and directed to a polarization beam splitter (PBS) 21. The PBS 21 spatially separates the two polarizations states of the beam and two beams emerge from the PBS 21. One of the beams emerges with S-polarization, as indicated by the dot in a circle, while the other beam 12 emerges with P-polarization, as indicated by the double headed arrow. The P-polarization beam goes straight through the PBS 21 is passed to the collection lens 8b and heads onto the kitty PCM 9. The S-polarization beam is passed through a halfwave plate 17, which rotates its polarization state by 90 degrees so that it becomes P-polarized. This beam 19 is also passed to the collection lens 8b which directs the light collected from the PBS 21 and collected from the halfwave plate 17 to the kitty PCM 9. Suitable mirror(s) or other optic elements 18 are used to direct beams 12 and 19 onto the kitty PCM 9.

The kitty PCM 9, which is pumped by the pump beam 10, generates a wavefront-reversed replica of the probe beam, which then retraces it steps in returning to the kitty PCM 9 via the halfwave plate 17 and via the PBS 21 directly so the beam emerging from the PBS 21 towards lens 8a and the object 6 again has a "time-reversed" polarization state relative to the light reflecting from the object 6. After reflecting off the object 6 on the return path, the polarization state returns to be the same polarization state as that of the probe beam 11 and also, for that matter, with the same spatial profile as the probe beam. This reflected beam is then split off by an upstream beam splitter such as by beam splitter 4 into a coherent detector (a heterodyne detector 5 in the case of the embodiment of FIG. 4a or a homodyne detector 5' in the case of the embodiment of FIG. 4b) or by a beam splitter in the vibrometer 20 of the embodiment of FIG. 5.

Figure 6:
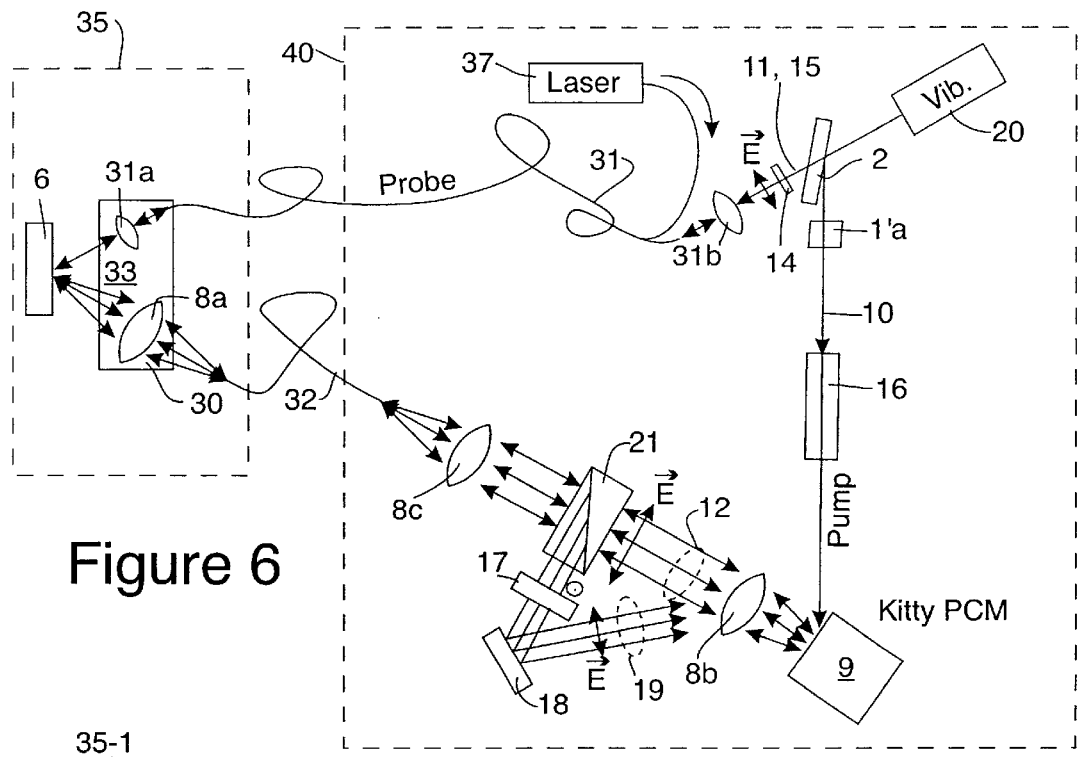
FIG. 6 is an embodiment which utilizes fiber optic cables to communicate the light to and from the object being examined.

If desired, fiber optic cables can be used with any of the embodiments discussed above to convey the light to and from the object 6. FIG. 6 shows the embodiment of FIG. 5 modified to include a pair of fiber optic cables 31, 32. Fiber 31 conveys light between the object 6 and beam splitter 2. Fiber 32 conveys light between the object 6 and PBS 21 (in the case of the modification of the embodiment of FIG. 5) or kitty PCM 9 (in the case of modification of the other embodiments). Fiber 32 should be a multi-mode optical fiber. Fiber 31 is preferably a single-mode cable and indeed may be amplifying (in which case a laser 37 is used to pump the cable) and polarization preserving. Alternatively, fiber 31 may be a multi-mode fiber optic cable. If fiber 31 is multi-mode it can collect undesirable backscattered light and therefore in such an embodiment optical spatial filter 14 should be utilized. If fiber 31 is a single mode fiber then it inherently performs a function equivalent to filter 14 and thus filter 14 is not needed in such an embodiment. Fiber 31 preferably has lenses 31a and 31b or other light diffractive elements at its ends to focus the light carried thereby as is known by those skilled in the technology. Fiber 32 also preferably has lenses 8a and 8c (or other light diffractive elements) at its ends. Lens 8a is the same lens 8a discussed above which collects the light scattering off the object 6. Lens 8c delivers the scattered light conveyed by the multi-mode fiber 32 to PBS 21 in this embodiment. If PBS 21 and its associated elements are not used, then lens 8c is replaced by lens 8b (or other light diffractive element) so that the scattered light from the end of fiber 32 is preferably delivered directly to the kitty PCM 9.

Fibers 31, 32 can be bundled together to simplify the system layout, if desired, and a robotic manipulator 30 can be used, if desired, to direct the light by moving a fiber "head" 33 to various regions on the object 6 to be inspected. The fiber head 33 includes the optical elements disposed at the distal ends fibers 31, 32 such as lenses 31a and 8a. The other components of the system which are shown in the dashed line boxed labeled with the numeral 40 can then be housed in a separate location, far removed, if desired, from the object 6. The proximate components used to inspect object 6 are depicted within a dashed line box labeled with the numeral 35. In this manner, the major optical elements and the PCM vibrometer system 40 can be located in a closed, protected environment, while the sample 6 can be in an assembly area (which may be in a less clean, industrial environment) together with elements 35. The head 33 and fibers 31, 32 are secured to the robotic manipulator 30.

Figure 7:
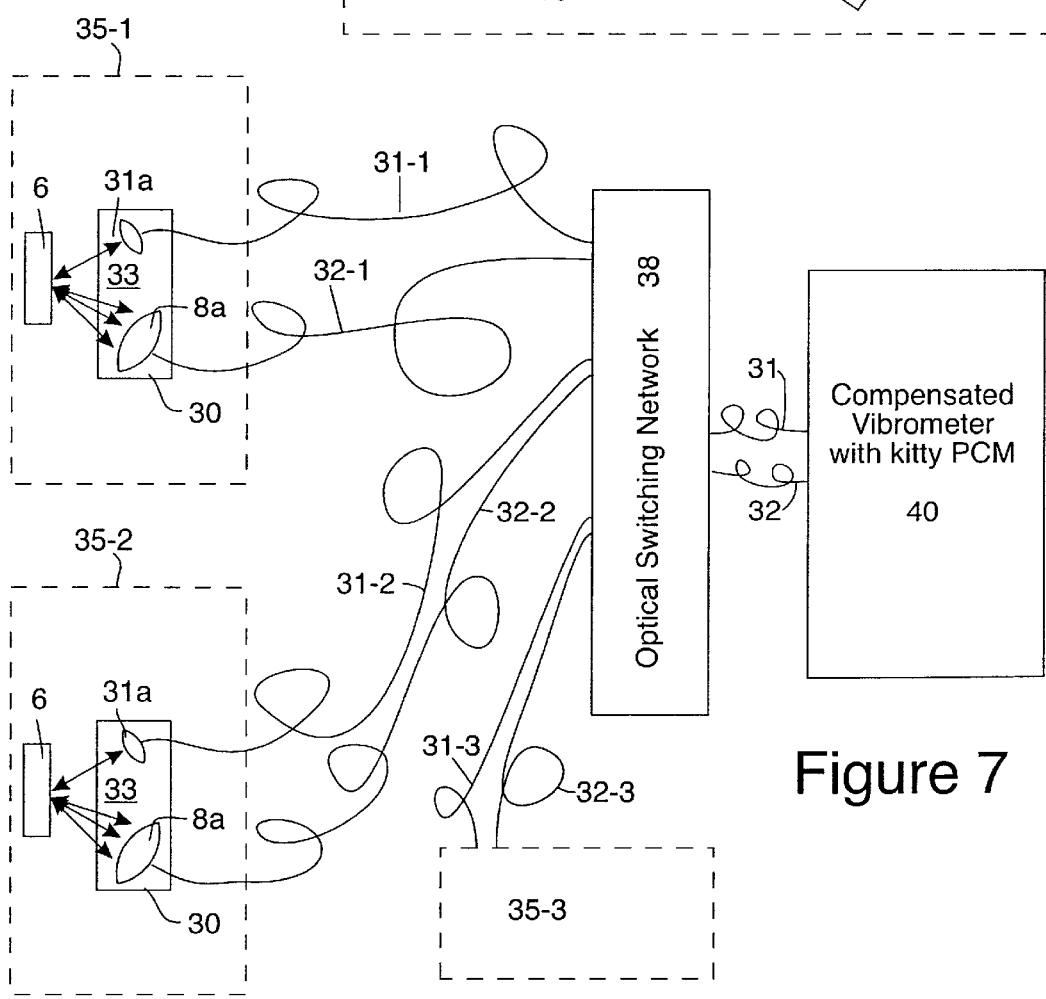
FIG. 7 is an embodiment which provides for multiple sensors to be used with a single compensated vibrometer preferably of the type disclosed with reference to FIG. 6.

Turning now to FIG. 7, an optical switching network 38 can be used to "switch" light on fibers 31, 32 from the vibrometer system 40 to different pairs of optical fiber delivery modules 35-1, 35-2, 35-3 . . . , with each fiber pair 31-1, 32-1; 31-2, 32-2; 31-3, 32-3 . . . thereof direction and collecting the light to different parts of one object or sample 6 or to different objects or samples 6 located, perhaps, in different assembly, manufacturing or probing areas.

Returning to the other figures, the probe path 11 directed from the beam splitter (element 4 in FIGS. 1a, 1b, 4a or 4b; or element 2 in FIG. 2 or 5) to the object 6 can be in the form of an optical fiber (such as, for example, a polarization-preserving single-mode fiber) as is shown in FIG. 6. The probe-beam light (which is scattered by the object or sample 6) is then collected by lens 8a and multi-mode optical fiber 32. A multi-mode fiber (as opposed to a single-mode fiber) is needed here, since the light scattered by the sample consists of many spatial modes (hundreds to tens of thousands) and, therefore, a fiber that can guide many such modes should be used (otherwise, light will be lost). Since multi-mode fibers are typically not polarization-preserving, the embodiments of FIGS. 4a, 4b and 5 would be preferably utilized if optical fibers are also utilized since these embodiments compensate for depolarization (which can occur from scattering off the sample, as well as a result of propagation through the multi-mode fiber).

Figure 8:
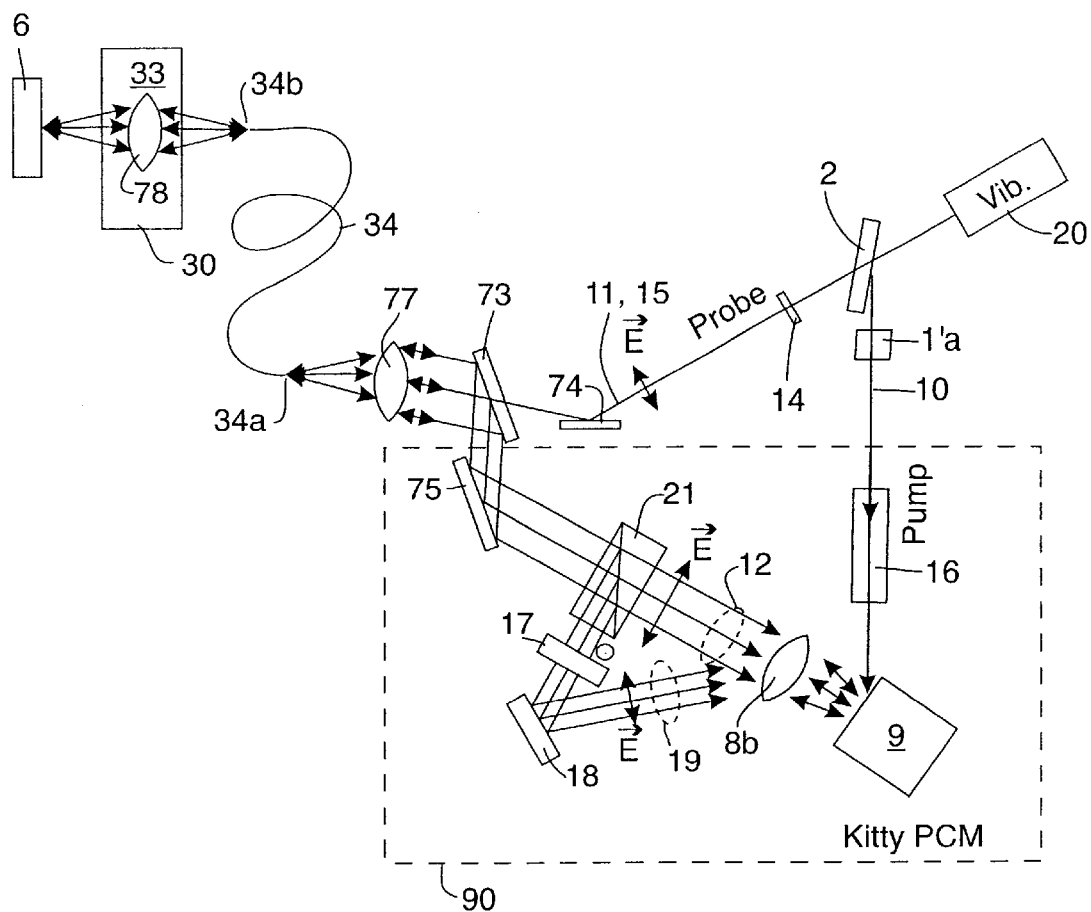
FIG. 8 is an embodiment which utilizes a single optical fiber per sensor and which preferably utilizes a compensated vibrometer of the type disclosed with reference to FIG. 6.

As yet an additional embodiment, a compensated vibrometer system similar to that shown in FIG. 6 can be configured to utilize a single optical fiber, instead of a pair of optical fibers 31, 32 to direct the light to the object or sample 6 and back for wavefront compensation and reversed propagation through the system. Such an embodiment is depicted by FIG. 8 wherein a single multi-mode fiber 34 (the single fiber) is used to direct the initial beam 11 from the single-mode (or, equivalently, a single speckle) optical source such as vibrometer 20 to the object 6 to be probed. A $50/50$ beam splitter 73 is placed between the vibrometer 20 and the input end 34a (the upstream end) of the single fiber (and, downstream of the beam splitter 2 from which the pump beam 10 is derived). Thus, the light from the vibrometer 20 passes through the added beam splitter 73 prior to being coupled into the single fiber 34. The light exiting the fiber 34 at its downstream end 34b is directed to the sample 6 by a lens 78 (or other diffractive optical element). This light may no longer be a single-mode, since as the light propagates through the multi-mode fiber 34, it can couple into many of the guided modes of the fiber. This effect is of no major concern, and will only result in a slightly larger focused probe spot on the object 6 to be interrogated. The scattered light from the object 6 is collected by the same multi-mode fiber 34.

As the light exits the fiber 34 at its upstream end 34a, the added beam splitter directs about 50% of the light towards the kitty PCM system 90 (which preferably includes the polarization compensation components 17, 18, 21 depicted in FIG. 8), thereby generating a wavefront-reversed replica, which system 90 also compensates for depolarization by means of PBS 21 and the other compensation components 17, 18. The wavefront-reversed replica produced by the kitty PCM 9 then goes back through the system 90, retracing its path, reflects off the added beam splitter 73, and re-enters the single multi-mode fiber 34 at its upstream end 34a. The wavefront-reversed replica then exits the single fiber at its downstream end 34b, strikes object 6 again, re-enters the single fiber 34, and emerges after this double-pass system, as a single-speckle beam. This beam then passes through the added beam splitter 73 and re-traces its path via optical spatial filter 14 back into the vibrometer 20 as a single-speckle beam, with twice the sample vibration displacement, owing to the double striking of object 6. Filter 14 inhibits the scattered light passing through splitter 73 in the direction of vibrometer 20 from reaching vibrometer 20. Even though the added beam splitter 73 has been encountered four times in this embodiment (amounting to $0.5 \times 0.05 \times 0.5 \times 0.5 = \frac{1}{16}$ net optical light power) and the object 6 has been encountered two times (resulting in a net loss of about 50% to 80%), the fact that hundreds of thousands to millions of speckles have been processed (instead of a single speckle using a conventional vibrometer), coupled with the amplification property of the kitty PCM 9, will result in a net overall signal-to-noise advantage of this system over the prior art.

In FIG. 8, element 77 is a lens or other diffractive optical element used to collect the light at end 34a of fiber 34. Elements 74 and 75 are mirrors or other reflective elements used to align the various laser beams relative to each other. Of course, additional or fewer such reflective and/or diffractive elements may be used in this embodiment or indeed in any of the disclosed embodiments as a matter of design choice in order to cause the laser beams to arrive at their intended destinations.

In the various figures, components which are the same between embodiments use the same reference numerals. Elements which are different, but which perform analogous functions, are sometimes associated with one another by a prime mark (') in an otherwise common reference numeral.

Having described the invention in connection with a number of embodiments, modification will now certainly suggest itself to those skilled in the art. For example, instead of lenses, other light diffractive optical elements can be utilized and additional diffractive elements and/or reflective elements may be utilized to convey the light along the desired paths. The paths taken by the laser light may be in free space, in a vacuum, in an atmosphere or in a light conductive medium such as an optical fiber. Some embodiments are described with reference to an off-the-shelf vibrometer 20. Such embodiments may be easily modified to utilized discrete components of the types described with reference to FIGS. 1a, 1b, 4a and 4b in lieu of an off-the-shelf vibrometer 20. As such, the invention is not be limited to the disclosed apparatus, except as required by the appended claims.

What is claimed is:

1. A vibrometer for probing an object to determine its vibratory signature, the vibrometer comprising:
   (a) a laser for generating a laser beam for probing the object;
   (b) a detector for detecting light reflecting from the object; and
   (c) a two beam input phase-conjugate mirror located so as to receive first and second portions of the laser beam produced by the laser, the first portion not impinging the object and the second portion being reflected by the object, the two input beam phase-conjugate mirror reflecting a wavefront reversed replica of signals received from the object back to the object for reflection therefrom as an object-reflected wavefront reversed replica signal to said detector; and
   (d) an optical spatial filter in a common optical path conveying light from the laser to the object for initial reflection thereby and also conveying the object-reflected wavefront reversed replica signal to said detector.

2. The vibrometer of claim 1 wherein the detector comprises a local oscillator and a heterodyne detector.

3. The vibrometer of claim 2 wherein the local oscillator comprises said laser in combination with an acousto optic modulator.

4. The vibrometer of claim 1 wherein the detector comprises a local oscillator and a homodyne detector.

5. The vibrometer of claim 4 wherein the local oscillator comprises said laser in combination with a beam splitter.

6. The vibrometer of claim 1 further including a beam splitter in the path of a laser beam emitted by the laser for directing a portion of the emitted beam toward said two beam input phase-conjugate mirror to act as an optical pump therefor.

7. The vibrometer of claim 6 wherein the two beam input phase-conjugate mirror is a "kitty" phase-conjugate mirror.

8. The vibrometer of claim 6 wherein the two beam input phase-conjugate mirror is selected from the group consisting of (i) crystal made of doped or undoped barium titanate, InP, GaAs, and CdTe or (ii) other self-pumped PCMs with non-linear optical materials, including photorefractive polymers, multiple quantum wells or general real-time holographic media.

9. The vibrometer of claim 1 further including at least one lens disposed between the object and the two beam input phase-conjugate mirror for collecting the laser light reflected by the object and for collecting the laser light reflected by the two beam input phase-conjugate mirror.

10. The vibrometer of claim 1 wherein the two beam input phase-conjugate mirror is a "kitty" phase-conjugate mirror.

11. A vibrometer for probing an object to determine its vibratory signature, the vibrometer comprising:
    (a) a laser for generating a laser beam for probing the object;
    (b) a detector for detecting light reflecting from the object;
    (c) a two beam input phase-conjugate mirror located so as to receive first and second portions of the laser beam produced by the laser, the first portion not impinging the object and the second portion being reflected by the object, the two input beam phase-conjugate mirror reflecting a wavefront reversed replica of signals received from the object back to the object for reflection therefrom to said detector; and
    (d) a polarization beam splitter disposed between the object and the two beam input phase-conjugate mirror, the polarization beam splitter spatially separating two polarization states of the object-reflected laser beam into two beams, one of said two beams being applied to a halfwave plate before being applied to said two beam input phase-conjugate mirror in order to change its polarization state and the other said two beams being applied to said two beam input phase-conjugate mirror without changing its polarization state.

12. The vibrometer of claim 1 further including an amplifier for amplifying the portion of the laser beam produced by the laser which impinges the two beam input phase-conjugate mirror without striking the object.

13. The vibrometer of claim 1 further including at least one optical fiber for conveying laser light to and from the object.

14. The vibrometer of claim 13 wherein the at least one optical fiber is a single multi-mode optical fiber, wherein an optical beam splitter is disposed in a path between the laser and the object, the beam splitter being arranged to divide the light reflecting from the object into two paths, one path being directed back to the laser via the optical spatial filter and the other path being directed towards the two beam input phase-conjugate mirror.

15. The vibrometer of claim 14 further including a polarization beam splitter disposed between the object and the two beam input phase-conjugate mirror, the polarization beam splitter spatially separating two polarization states of the object-reflected laser beam into two beams, one of said two beams being applied to a halfwave plate before being applied to said two beam input phase-conjugate mirror in order to change its polarization state and the other said two beams being applied to said two beam input phase-conjugate mirror without changing its polarization state.

16. The vibrometer of claim 13 including a single-mode optical fiber for conveying laser light from the laser to the object and a multi-mode fiber for conveying light from the object on its way to the two beam input phase-conjugate mirror.

17. The vibrometer of claim 16 further including a polarization beam splitter disposed between the object and the two beam input phase-conjugate mirror, the polarization beam splitter spatially separating two polarization states of the object-reflected laser beam into two beams, one of said two beams being applied to a halfwave plate before being applied to said two beam input phase-conjugate mirror in order to change its polarization state and the other said two beams being applied to said two beam input phase-conjugate mirror without changing its polarization state.

18. The vibrometer of claim 16 further including a laser for amplifying the light transmitted by the single-mode fiber.

19. The vibrometer of claim 13 further including a robotic manipulator for moving a head arranged at a remote end of the at least one optical fiber relative to the object.

20. An apparatus for improving a laser vibrometer, the vibrometer having a laser, said apparatus comprising a two beam input phase-conjugate mirror located so as to receive a portion of a laser beam produced by the vibrometer's laser and a portion of a laser beam reflected from an object whose vibratory signature is sought, the two input beam phase-conjugate mirror reflecting received laser light reflected by the object back towards the object as a wavefront-reversed replica of the received laser light.

21. The apparatus of claim 20 further including at least one lens disposed between the object and the two beam input phase-conjugate mirror for collecting the laser light reflected by the object and for collecting the laser light reflected by the two beam input phase-conjugate mirror.

22. The apparatus of claim 20 further including a polarization beam splitter arranged in an optical path between the object and the phase-conjugate mirror, the polarization beam splitter allowing light of a first polarization to pass onto the phase-conjugate mirror and the light of a second polarization to pass onto the phase-conjugate mirror after first being rotated to said first polarization by a halfwave plate.

23. The apparatus of claim 20 further including at least one optical fiber for conveying laser light to and from the object.

24. The apparatus of claim 23 wherein the at least one optical fiber is a single multi-mode optical fiber, wherein an optical beam splitter is disposed in a path between the vibrometer's laser and the object, the beam splitter being arranged to divide the light reflecting from the object into two paths, one path being directed back to the vibrometer via an optical spatial filter and the other path being directed towards the two beam input phase-conjugate mirror.

25. The apparatus of claim 24 further including a polarization beam splitter disposed between the object and the two beam input phase-conjugate mirror, the polarization beam splitter spatially separating two polarization states of the object-reflected laser beam into two beams, one of said two beams being applied to a halfwave plate before being applied to said two beam input phase-conjugate mirror in order to change its polarization state and the other said two beams being applied to said two beam input phase-conjugate mirror without changing its polarization state.

26. The apparatus of claim 23 including a single-mode optical fiber for conveying laser light from the laser to the object and a multi-mode fiber for conveying light from the object on its way to the two beam input phase-conjugate mirror.

27. The apparatus of claim 26 further including a polarization beam splitter disposed between the object and the two beam input phase-conjugate mirror, the polarization beam splitter spatially separating two polarization states of the object-reflected laser beam into two beams, one of said two beams being applied to a halfwave plate before being applied to said two beam input phase-conjugate mirror in order to change its polarization state and the other said two beams being applied to said two beam input phase-conjugate mirror without changing its polarization state.

28. The apparatus of claim 26 further including a laser for amplifying the light transmitted by the single-mode fiber.

29. The apparatus of claim 23 further including a robotic manipulator for moving a head arranged at a remote end of the at least one optical fiber relative to the object.

30. A method of measuring a vibratory signature of an object, the method comprising the steps of:
(a) impinging the object with a probing laser beam via an optical spatial filter;
(b) directing light scattered by the object to a two beam input phase-conjugate mirror;
(c) pumping the two beam input phase-conjugate mirror;
(d) reflecting a wavefront-reversed replica of the light directed to the two beam input phase-conjugate mirror back to the object; and
(e) directing wavefront-reversed replica light reflecting from the surface of the object to a detector apparatus via said optical spatial filter.

31. The method of claim 30 wherein the detector apparatus is a heterodyne detector which also receives a local oscillator signal from a local oscillator source.

32. The method of claim 31 wherein the local oscillator source comprises said laser in combination with an acousto optic modulator.

33. The method of claim 30 wherein the detector apparatus is a homodyne detector which also receives a local oscillator signal from a local oscillator source.

34. The method of claim 33 wherein the local oscillator source comprises said laser in combination with a beam splitter.

35. The method of claim 30 wherein the two beam input phase-conjugate mirror is pumped by a portion of the light emitted by a laser generating said probing laser beam.

36. The method of claim 30 wherein the steps of directing the light scattered off the object to a two beam input phase-conjugate mirror and reflecting a wavefront replica of the light directed to the two beam input phase-conjugate mirror back to the object include the step of focussing such light by means of at least one lens.

37. A method of measuring a vibratory signature of an object, the method comprising the steps of:
(a) impinging the object with a probing laser beam;
(b) directing light scattered by the object to a two beam input phase-conjugate mirror;
(c) pumping the two beam input phase-conjugate mirror;
(d) reflecting a wavefront-reversed replica of the light directed to the two beam input phase-conjugate mirror back to the object;

(e) directing wavefront-reversed replica light reflecting from the surface of the object to a detector apparatus; and (f) disposing a polarization beam splitter in an optical path between the object and the phase-conjugate mirror to direct the light of a first polarization onto the phase-conjugate mirror and to direct the light of a second polarization onto the phase-conjugate mirror only after first being rotated to said first polarization by a half-wave plate.

38. The method of claim 37 further including the steps of using a multi-mode optical fiber for conveying laser light to and from the object and disposing an optical beam splitter in the path between the laser and the object, the beam splitter being arranged to divide the light reflecting from the object into two paths, one path being directed back to the laser via an optical spatial filter and the other path being directed towards the two beam input phase-conjugate mirror.

39. The method of claim 30 further including the steps of using a multi-mode optical fiber for conveying laser light to and from the object and disposing an optical beam splitter in the path between the laser and the object, the beam splitter being arranged to divide the light reflecting from the object into two paths, one path being directed back to the laser via the optical spatial filter and the other path being directed towards the two beam input phase-conjugate mirror.

40. The method of claim 30 wherein the method measures a vibratory signatures of a plurality of objects, the method further including the step of optically switching (i) the probing laser beam from probing one of said plurality of objects to another one of said plurality of objects and (ii) the light scattering off and reflecting from said one of said plurality of objects to said another one of said plurality of objects.

41. The method of claim 30 further including the steps of conveying laser light from the laser to the object using a single-mode optical fiber and conveying light from the object on its way to the two beam input phase-conjugate mirror using a multi-mode fiber.

42. The method of claim 41 further including further including the step of disposing a polarization beam splitter in an optical path between the object and the phase-conjugate mirror to direct the light of a first polarization onto the phase-conjugate mirror and to direct the light of a second polarization onto the phase-conjugate mirror only after first being rotated to said first polarization by a halfwave plate.

43. The method of claim 41 further including the step of amplifying the light transmitted by the single-mode fiber.

44. An method of improving a laser vibrometer, the vibrometer having a laser, said method comprising disposing a two beam input phase-conjugate mirror to receive a portion of a laser beam produced by the vibrometer's laser and a portion of a laser beam reflected from an object whose vibratory signature is sought, the two input beam phase-conjugate mirror reflecting received laser light reflected by the object back towards the object as a wavefront-reversed replica of the received laser light.

45. The method of claim 44 further including disposing at least one lens disposed between the object and the two beam input phase-conjugate mirror for collecting the laser light reflected by the object and for collecting the laser light reflected by the two beam input phase-conjugate mirror.

46. The method of claim 44 further including disposing a polarization beam splitter in an optical path between the object and the phase-conjugate mirror, the polarization beam splitter allowing light of a first polarization to pass onto the phase-conjugate mirror and the light of a second polarization to pass onto the phase-conjugate mirror after first being rotated to said first polarization by a halfwave plate.

47. The method of claim 44 further including providing at least one optical fiber for conveying laser light to and from the object.

48. The method of claim 47 wherein the at least one optical fiber is a single multi-mode optical fiber and further including the steps of disposing an optical beam splitter in a path between the vibrometer's laser and the object, the beam splitter dividing the light reflecting from the object into two paths, one path being directed back to the vibrometer via an optical spatial filter and the other path being directed towards the two beam input phase-conjugate mirror.

49. The method of claim 48 further including disposing a polarization beam splitter between the object and the two beam input phase-conjugate mirror, the polarization beam splitter spatially separating two polarization states of the object-reflected laser beam into two beams, one of said two beams being applied to a halfwave plate before being applied to said two beam input phase-conjugate mirror in order to change its polarization state and the other said two beams being applied to said two beam input phase-conjugate mirror without changing its polarization state.

50. The method of claim 47 including providing a single-mode optical fiber for conveying laser light from the laser to the object and providing a multi-mode fiber for conveying light from the object on its way to the two beam input phase-conjugate mirror.

51. The method of claim 50 further including disposing a polarization beam splitter between the object and the two beam input phase-conjugate mirror, the polarization beam splitter spatially separating two polarization states of the object-reflected laser beam into two beams, one of said two beams being applied to a halfwave plate before being applied to said two beam input phase-conjugate mirror in order to change its polarization state and the other said two beams being applied to said two beam input phase-conjugate mirror without changing its polarization state.

52. The method of claim 50 further including a laser for amplifying the light transmitted by the single-mode optical fiber.

53. The method of claim 47 further including a robotic manipulator for moving a head arranged at a remote end of the at least one optical fiber relative to the object.

54. The vibrometer of claim 6 wherein the detector includes and s heterodyne detector and an acousto optic modulator, the acousto optic modulator being disposed in an optical path between said beam splitter and the object.

* * * * *